US011686406B2

(12) United States Patent
Sutterfield et al.

(10) Patent No.: US 11,686,406 B2
(45) Date of Patent: Jun. 27, 2023

(54) METHOD OF USING A BONNET AND STUFFING BOX ASSEMBLY

(71) Applicant: Mueller International, LLC, Atlanta, GA (US)

(72) Inventors: Matthew Thomas Sutterfield, Signal Mountain, TN (US); Ian Matthew Gilliam, Hixon, TN (US)

(73) Assignee: Mueller International, LLC, Atlanta, GA (US)

( * ) Notice: Subject to any disclaimer, the term of this patent is extended or adjusted under 35 U.S.C. 154(b) by 2 days.

(21) Appl. No.: 17/230,468

(22) Filed: Apr. 14, 2021

(65) Prior Publication Data
US 2021/0231232 A1  Jul. 29, 2021

Related U.S. Application Data

(63) Continuation of application No. 16/389,506, filed on Apr. 19, 2019, now Pat. No. 11,009,149.

(51) Int. Cl.
| | | |
|---|---|---|
| *F16K 41/02* | (2006.01) | |
| *F16K 27/08* | (2006.01) | |
| *F16K 5/06* | (2006.01) | |
| *F16K 27/02* | (2006.01) | |
| *F16K 41/14* | (2006.01) | |

(52) U.S. Cl.
CPC ............ *F16K 41/02* (2013.01); *F16K 5/0694* (2013.01); *F16K 27/02* (2013.01); *F16K 27/08* (2013.01); *F16K 41/14* (2013.01)

(58) Field of Classification Search
CPC ........ F16K 41/02; F16K 41/14; F16K 41/023; F16K 5/0694; F16K 27/02; F16K 27/08
See application file for complete search history.

(56) References Cited

U.S. PATENT DOCUMENTS

| 589,725 A * | 9/1897 | Hodge | .................... F16K 41/02 |
|---|---|---|---|
| | | | 251/214 |
| 3,262,709 A ‡ | 7/1966 | Hansen | .................. F16J 15/184 |
| | | | 277/524 |

(Continued)

OTHER PUBLICATIONS

Gilliam, Ian Matthew; Final Office Action for U.S. Appl. No. 16/389,506, filed Apr. 19, 2019, dated Nov. 23, 2020, 16 pgs.

(Continued)

*Primary Examiner* — Craig J Price
*Assistant Examiner* — Andrew J Rost
(74) *Attorney, Agent, or Firm* — Taylor English Duma LLP

(57) ABSTRACT

Example aspects of a method of using a bonnet and stuffing box assembly and a method of manufacturing a bonnet and stuffing box assembly are disclosed. The method of using a bonnet and stuffing box assembly can comprise providing a stuffing box, a bonnet, a bushing assembly, and a stem, the stuffing box and the bonnet defining an assembly bore, the bushing assembly received in the assembly bore, the bushing assembly defining a bushing bore, and the stem received through the bushing bore; sealing the stem relative to the bushing assembly to prohibit fluid flow through the bushing bore; sealing the bushing assembly relative to the bonnet to prohibit fluid flow through the assembly bore; and turning the stem relative to the bushing assembly, bonnet, and stuffing box to actuate a valve.

18 Claims, 5 Drawing Sheets

(56) References Cited

U.S. PATENT DOCUMENTS

| | | | | |
|---|---|---|---|---|
| 3,443,816 A * | 5/1969 | Saleri | ............... | F16K 41/046 |
| | | | | 251/214 |
| 3,753,569 A ‡ | 8/1973 | Bonomi | ............... | F16K 41/026 |
| | | | | 277/532 |
| 4,317,573 A ‡ | 3/1982 | Karkkainen | ............... | F16K 41/18 |
| | | | | 251/214 |
| 4,640,305 A ‡ | 2/1987 | Johnson | ............... | F16J 15/186 |
| | | | | 137/312 |
| 5,209,501 A ‡ | 5/1993 | Smith | ............... | B05B 1/3046 |
| | | | | 277/522 |
| 5,238,252 A ‡ | 8/1993 | Stewen | ............... | F16K 41/02 |
| | | | | 251/214 |
| 5,470,046 A * | 11/1995 | Mack | ............... | F16K 27/08 |
| | | | | 251/329 |
| 5,979,483 A * | 11/1999 | Zapalac | ............... | F16K 41/02 |
| | | | | 277/516 |
| 6,267,353 B1 * | 7/2001 | Friedline | ............... | F16K 5/0605 |
| | | | | 251/315.1 |
| 6,524,007 B1 * | 2/2003 | Hinks | ............... | F16J 15/50 |
| | | | | 384/138 |
| 6,834,998 B2 * | 12/2004 | Hinks | ............... | F16J 15/50 |
| | | | | 384/138 |
| 7,448,595 B2 * | 11/2008 | Pohn | ............... | F16K 3/28 |
| | | | | 251/327 |
| 7,950,625 B2 ‡ | 5/2011 | Pohn | ............... | F16K 3/28 |
| | | | | 251/327 |
| 8,622,367 B2 ‡ | 1/2014 | Lovell | ............... | F16K 41/02 |
| | | | | 251/214 |
| 9,032,781 B2 * | 5/2015 | Fleury | ............... | F16K 3/314 |
| | | | | 137/551 |
| 9,512,931 B2 ‡ | 12/2016 | Nicholson | ............... | F16K 27/0254 |
| 10,167,976 B2 * | 1/2019 | Nitta | ............... | F16K 41/02 |
| 11,009,149 B2 | 5/2021 | Gilliam et al. | | |
| 2004/0251635 A1 ‡ | 12/2004 | Ishida | ............... | F16J 15/18 |
| | | | | 277/510 |
| 2018/0231134 A1 ‡ | 8/2018 | Willers | ............... | B23P 15/001 |
| 2020/0332918 A1 | 10/2020 | Gilliam et al. | | |

OTHER PUBLICATIONS

Gilliam, Ian Matthew; Non-Final Office Action for U.S. Appl. No. 16/389,506, filed Apr. 19, 2019, mailed 21 pgs.

Gilliam, Ian Matthew; Notice of Allowance for U.S. Appl. No. 16/389,506, filed Apr. 19, 2019, dated Jan. 15, 2021, 11 pgs.

* cited by examiner

‡ imported from a related application

METHOD OF USING A BONNET AND STUFFING BOX ASSEMBLY

CROSS-REFERENCE TO RELATED APPLICATIONS

The present application is a continuation of U.S. application Ser. No. 16/389,506, filed Apr. 19, 2019, which is hereby specifically incorporated by reference herein in its entirety.

TECHNICAL FIELD

This disclosure relates to the field of stuffing boxes. More specifically, this disclosure relates to a bonnet and stuffing box assembly comprising a bushing assembly.

BACKGROUND

Bonnet and stuffing box assemblies are connected to fluid pipeline systems, such as municipal water systems, and allow operators to operate a valve, or other device, connected thereto. Bonnet and stuffing box assemblies can comprise a bonnet, a stuffing box, and a stem. Each of the bonnet and the stuffing box can define a stem bore through which the stem can extend. The stem bores typically must be precision-machined for optimal engagement with the stem. However, precision machining large components like the bonnet and stuffing box can significantly slow down and decrease the efficiency of the manufacturing and assembly processes. Furthermore, various components of the bonnet and stuffing box assembly often are formed from materials that are not corrosion-resistant, such as iron. Such materials can quickly rust. In some instances, rust can develop even before the assembly of the components due to the slowed manufacturing timeline. Rust can decrease the functionality and lifespan of the bonnet and stuffing box assembly. Rust can also pose health risks to the public, for example, when introduced into drinking water applications.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is a bushing assembly for a bonnet and stuffing box assembly, the bushing assembly comprising a stuffing box bushing, the stuffing box bushing defining an outer stuffing box bushing surface and a stuffing box bushing bore wall; and a bonnet bushing, the bonnet bushing defining an outer bonnet bushing surface and a bonnet bushing bore wall, the bonnet bushing bore wall and the stuffing box bushing bore wall together defining a bushing bore configured to receive a stem therethrough Also disclosed is a bonnet and stuffing box assembly comprising a bonnet, the bonnet defining a bonnet bore; a stuffing box connected to the bonnet, the stuffing box defining a stuffing box bore, the stuffing box bore and bonnet bore defining an assembly bore; a bushing assembly received in the assembly bore, the bushing assembly defining a bushing bore; and a stem extending through the bushing bore.

Also disclosed is a method for using a bonnet and stuffing box assembly comprising providing a stuffing box, a bonnet, a bushing assembly, and a stem, the stuffing box and bonnet defining an assembly bore, the bushing assembly received in the assembly bore, the bushing assembly defining a bushing bore, and the stem received through the bushing bore; sealing the stem relative to the bushing assembly to prohibit fluid flow through the bushing bore; sealing the bushing bore relative to the bonnet to prohibit fluid flow through the assembly bore; and turning the stem relative to the bushing assembly, bonnet, and stuffing box to actuate a valve.

Disclosed is a method of using a bonnet and stuffing box assembly can comprise providing a stuffing box, a bonnet, a bushing assembly, and a stem, the stuffing box and the bonnet defining an assembly bore, the bushing assembly received in the assembly bore, the bushing assembly defining a bushing bore, and the stem received through the bushing bore; sealing the stem relative to the bushing assembly to prohibit fluid flow through the bushing bore; sealing the bushing assembly relative to the bonnet to prohibit fluid flow through the assembly bore; and turning the stem relative to the bushing assembly, bonnet, and stuffing box to actuate a valve.

A method of manufacturing a bonnet and stuffing box assembly is also disclosed, the method comprising casting a bonnet and a stuffing box from a corrosion-resistant material, the bonnet and stuffing box together defining an assembly bore; precision-machining a stuffing box bushing bore wall of a stuffing box bushing; precision-machining a bonnet bushing bore wall of a bonnet bushing, the bonnet bushing and stuffing box bushing together defining a bushing assembly, the bonnet bushing bore wall and the stuffing box bushing bore wall together defining a bushing bore; and positioning the bushing assembly within the assembly bore.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 2:
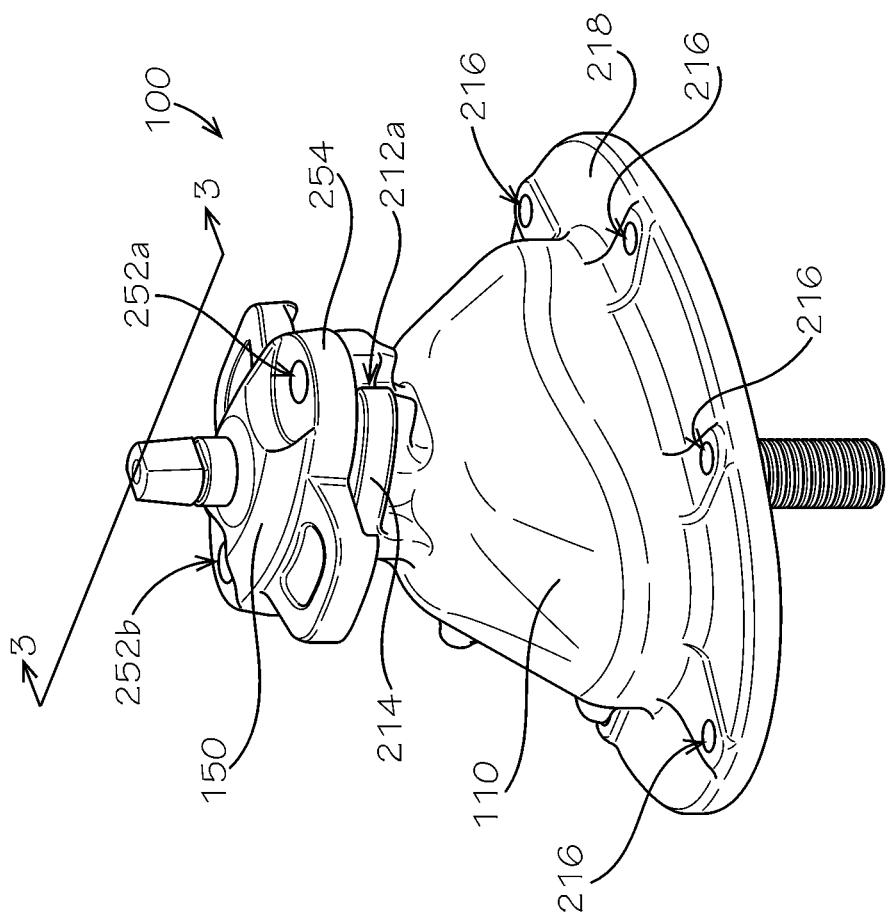
FIG. 2 is a top perspective view of the bonnet and stuffing box assembly of FIG. 1.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a bushing assembly and associated methods, systems, devices, and various apparatus. Example aspects of the bushing assembly can comprise a first bushing and a second bushing, wherein the first and second bushings defining a bushing bore configured to receive a stem therethrough. Also disclosed in the present application is a bonnet and stuffing box assembly and associated methods, systems, devices, and various apparatus. Example aspects of the bonnet and stuffing box assembly can comprise a bonnet, a stuffing box, a stem, and a bushing assembly. It would be understood by one of skill in the art that disclosed bushing assembly and the disclosed bonnet and stuffing box assembly are described in but a few exemplary aspects among many. No particular terminology or description should be considered limiting on the disclosure or the scope of any claims issuing therefrom.

Figure 1:
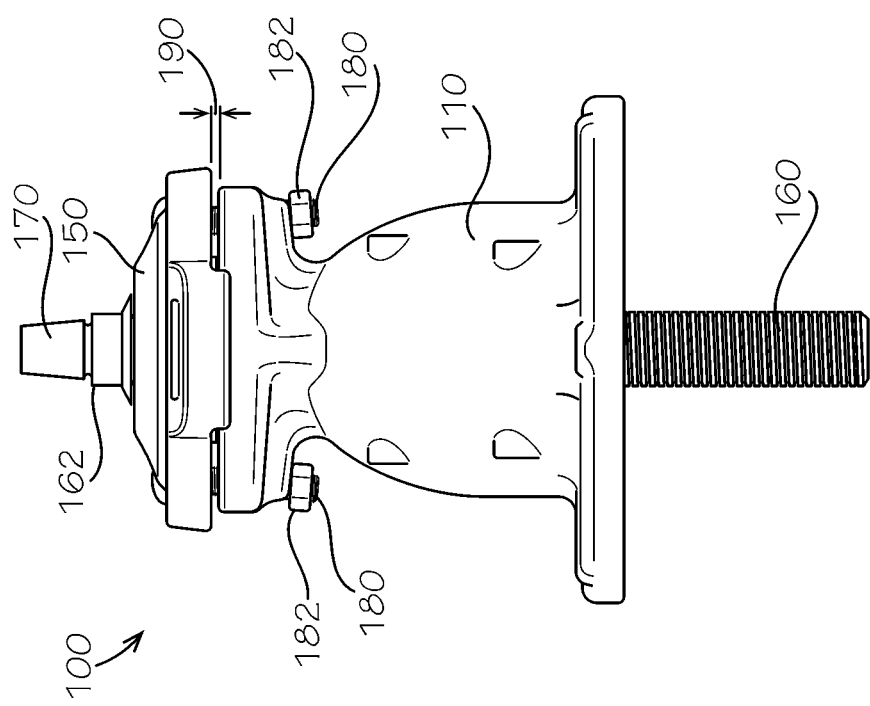
FIG. 1 is a front view of a bonnet and stuffing box assembly, in accordance with one aspect of the present disclosure.

FIG. 1 illustrates a first aspect of a bonnet and stuffing box assembly 100 according to the present disclosure. As shown, the bonnet and stuffing box assembly 100 can comprise a bonnet 110, a stuffing box 150, and a stem 160 extending through the bonnet 110 and the stuffing box 150. In example aspects, a gap 190 can be defined between the bonnet 110 and the stuffing box 150. An actuator, such as an op nut 170 (i.e., an operating nut), can be coupled to a top end 162 of the stem 160, relative to the orientation shown. The actuator can be configured to actuate the stem 160, as described in further detail below. The stuffing box 150 can be connected to the bonnet 110 by a fastener, such as one or more bolts 180 and nuts 182, as shown. In other aspects, the fastener(s) can be screws, welding, clips, adhesives, or any other suitable fastener known in the art. Example aspects of the bonnet and stuffing box assembly 100 can be configured for fluid pipeline systems, such as, for example, a municipal water system, a sanitary sewer system, an oil pipeline system, or the like.

In example aspects, the bonnet 110 and the stuffing box 150 can be manufactured by a casting process. In some aspects, the bonnet 110 and stuffing box 150 can be formed from an inherently corrosion-resistant material, such as, for example, bronze or stainless steel, or can comprise a corrosion-resistant coating, such as, for example an e-coating, which can be applied by an electrophoretic painting process.

Corrosion-resistant materials can provide a benefit of preventing rust from forming on the components, as rust can decrease the efficiency and functionality of the components. Rust can also be dangerous when introduced in drinking water applications. Example aspects of the stem 160 can similarly be formed from a corrosion-resistant material, such as bronze or stainless steel, or can be coated in a corrosion-resistant coating. In a particular aspect, the stem can be formed from manganese bronze, and in another particular aspect, the stem can be formed from silicon bronze. Furthermore, in example aspects, the material of the stem 160 and/or other components of the bonnet and stuffing box assembly 100 can be selected as desired by a customer for an optimal interaction with the fluid in the fluid pipeline system, dependent upon the fluid's particular chemistry.

Referring to FIG. 2, in the present aspect, the stuffing box 150 can define a pair of fastener openings 252a,b formed proximate a bottom end 254 thereof, relative to the orientation shown, and the bonnet 110 can define a pair of fastener slots 212a,b (212b not shown) proximate a top end 214 thereof, relative to the orientation shown. Each fastener opening 252a,b can be aligned with a corresponding fastener slot 212a,b, and one of the bolts 180 (shown in FIG. 1) can be inserted through each pair of corresponding fastener openings 252a,b and fastener slots 212a,b. The nut 182 (shown in FIG. 1) can be tightened on the corresponding bolt 180 to secure the stuffing box 150 to the bonnet 110 and to draw the stuffing box 150 towards the bonnet 110. In the present aspect, the gap 190 (shown in FIG. 1) can remain between the bonnet 110 and stuffing box 150 when the nuts 182 are tightened. In other aspects, the bonnet and stuffing box assembly 100 may not comprise the gap 190 when the fasteners are tightened.

According to example aspects, the bonnet and stuffing box assembly 100 can be configured to be coupled to equipment (not shown) related to a fluid pipeline system. For example, the bonnet and stuffing box assembly 100 can be configured to couple a valve, such as a gate valve, butterfly valve, check valve, or any other suitable equipment associated with a fluid pipeline system. As shown in FIG. 2, the bonnet 110 can define one or more coupling bores 216, each configured to receive a fastener (not shown) therethrough, such as a nut and bolt assembly, to facilitate coupling the bonnet and stuffing box assembly 100 to the equipment. In the present aspect, the coupling bores 216 can be formed on a bonnet flange 218 distal from the stuffing box 150, as shown. In other aspects, the bonnet and stuffing box assembly 100 can be coupled to the equipment by any other suitable fastener known in the art, including but not limited to screws, welding, clips, adhesives, and the like.

Figure 3:
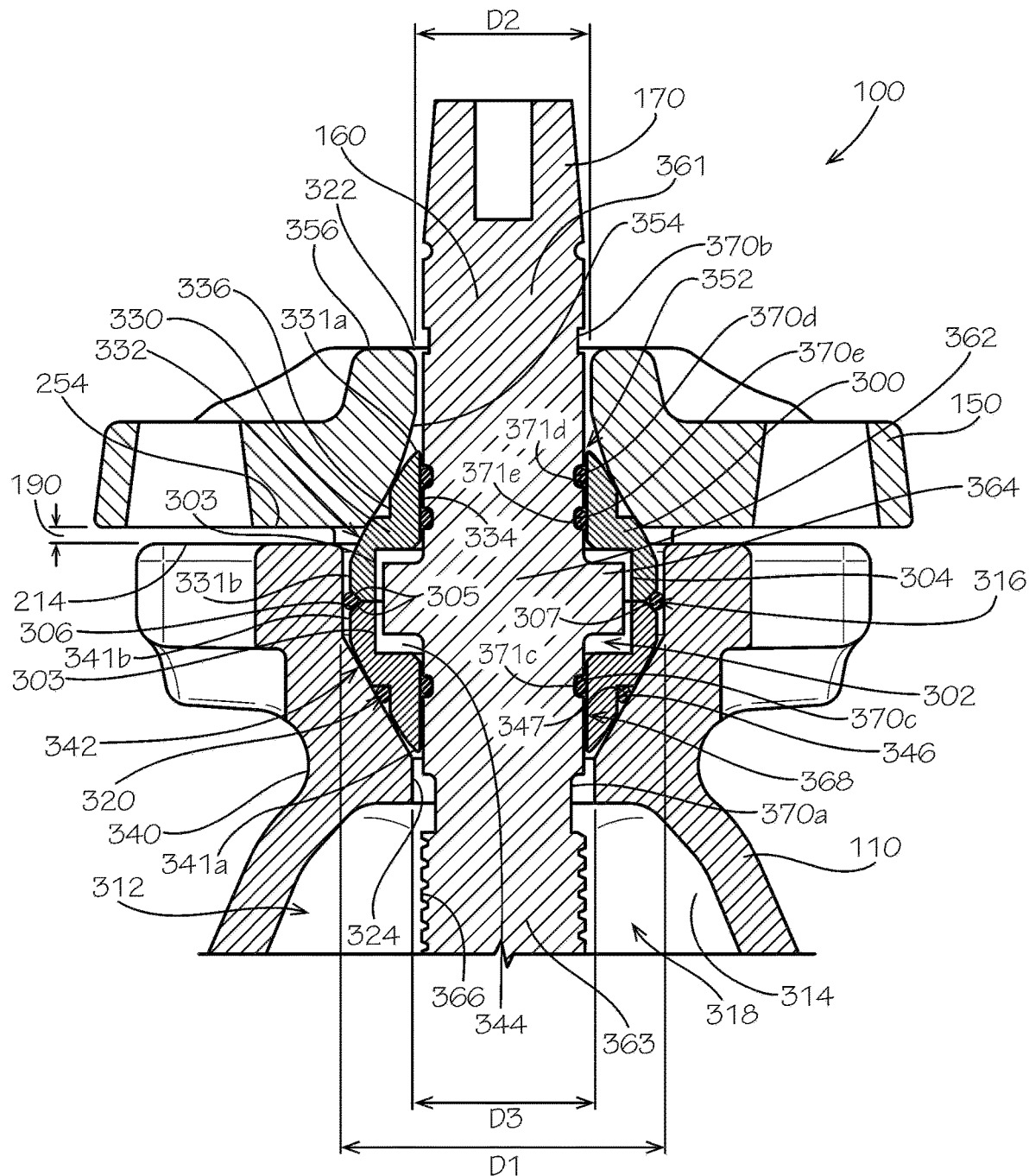
FIG. 3 is a cross-sectional view of the bonnet and stuffing box assembly of FIG. 1 taken along line 3-3 of FIG. 1.

FIG. 3 illustrates a cross-sectional view of the bonnet and stuffing box assembly 100, taken along line 3-3 in FIG. 2. The bonnet 110 can define a bonnet bore 312, and the stuffing box 150 can define a stuffing box bore 352. The bonnet bore 312 can be defined by a bonnet bore wall 314 of the bonnet 110, and the stuffing box bore 352 can be defined by a stuffing box bore wall 354 of the stuffing box 150. Example aspects of the bonnet bore 312 can generally define an upper bonnet bore portion 316 and a lower bonnet bore portion 318, as shown. The upper bonnet bore portion 316 and the stuffing box bore 352 can be in facing engagement and can together define an assembly bore 320. The assembly bore 320 can define a top bore end 322 and a bottom bore end 324, relative to the orientation shown. The top bore end 322 can be formed at a top end 356 of the stuffing box 150. The bottom bore end 324 can be formed where the upper bonnet bore portion 316 meets the lower bonnet bore portion 318.

As shown, in example aspects, the stuffing box bore wall 354 can taper from the bottom end 254 of the stuffing box 150 towards the top bore end 322, such that a substantially conical shape is defined. The bonnet bore wall 314 can taper from the top end 214 of the bonnet 110 towards the bottom bore end 324, such that an inverted substantially conical shape is defined by the upper bonnet bore portion 316. As such, the assembly bore 320 can define a diameter $D_1$ at a midpoint thereof that can be greater than a diameter $D_2$ at the top bore end 322 and a diameter $D_3$ at the bottom bore end 324. In one example aspect, the bonnet 110 and stuffing box 150 can be formed from a ductile iron material, and the corresponding bonnet bore wall 314 and stuffing box bore wall 354 can be coated or partially coated in an e-coating to protect from corrosion.

The stem 160 can be configured to extend fully through the assembly bore 320. In the present aspect, a middle portion 362 of the stem 160 can be received in the stem bore, an upper portion 361 of the stem 160 can extend beyond the top bore end 322, and a lower portion 363 of the stem 160 can extend beyond the bottom bore end 324. Example aspects of the stem 160 can define a stem flange 364 extending from the middle portion 362, as shown. The op nut 170 can be attached to the upper portion 361 of the stem 160 and can be configured to be engaged by a wrench or other tool to operate the stem 160. The lower portion 363 of the stem 160 can define threading 366 for threaded engagement with a valve, such as, for example, a gate valve. In other aspects, the stem 160 can define any surface arrangement for use with any desired valve, such as a butterfly valve, a check valve, and the like.

A bushing assembly 300 can be received in the assembly bore 320 and can define a bushing bore 302 through which the stem 160 can extend. In the present aspect, the bushing assembly 300 can comprise a stuffing box bushing 330 and a bonnet bushing 340. The stuffing box bushing 330 can be substantially received in the stuffing box bore 352, and the bonnet bushing 340 can be substantially received in the upper bonnet bore portion 316. In some aspects, as shown, a portion of the stuffing box bushing 330 can also engage the upper bonnet bore portion 316. An outer stuffing box bushing surface 332 of the stuffing box bushing 330 can engage the stuffing box bore wall 354, and an outer bonnet bushing surface 342 of the bonnet bushing 340 can engage the bonnet bore wall 314 within the upper bonnet bore portion 316. The stuffing box bushing 330 can define a substantially conical shape similar to the substantially conical shape of the stuffing box bore 352, and the bonnet bushing 340 can define an inverted substantially conical shape similar to the upper bonnet bore portion 316. For example, the outer stuffing box bushing surface 332 of the stuffing box bushing 330 can taper outward from a first end 331a thereof to a second end 331b thereof, and the outer bonnet bushing surface 342 of the bonnet bushing 340 can taper outward from a first end 341a thereof to a second end 341b thereof. When assembled, the second end 341b of the bonnet bushing 340 can confront the second end 331b of the stuffing box bushing 330.

In the present aspect, as shown, the stuffing box bushing 330 and the bonnet bushing 340 can be substantially identical and can be symmetrical when installed in the bonnet and stuffing box assembly 100. However, in other aspects, such as the aspects illustrated in FIGS. 5 and 6, the stuffing box bushing 330 and bonnet bushing 340 can differ in shape and can be asymmetrical when installed in the bonnet and stuffing box assembly 100. Furthermore, example aspects of the stuffing box bushing 330 and the bonnet bushing 340 can be formed from an material that is inherently corrosion-resistant and that can be precision-machined, such as, for example, bronze or stainless steel, or can comprise a corrosion-resistant coating, such as, for example an e-coating, which can be applied by an electrophoretic painting process.

The stuffing box bushing 330 can define a stuffing box bushing bore wall 334, and the bonnet bushing 340 can define a bonnet bushing bore wall 344. The stuffing box bushing bore wall 334 and bonnet bushing bore wall 344 can together define the bushing bore 302, as shown. According to example aspects, each of the stuffing box bushing bore wall 334 and the bonnet bushing bore wall 344 can be precision-machined for optimal engagement with the middle portion 362 of the stem 160 to capture the stem flange 364 therebetween. In some aspects, the outer bonnet bushing surface 342 and/or the outer stuffing box bushing surface 332 can also be precision-machined for optimal engagement with the bonnet 100 and stuffing box 150. In still other aspects, the entire bonnet bushing 340 and/or the entire stuffing box bushing 330 can be precision-machined.

According to example aspects, each of the stuffing box bushing 330 and the bonnet bushing 340 can define an annular indentation 303 formed in the corresponding bushing bore walls 334, 344, respectively. The annular indentations 303 of the stuffing box bushing 330 and bonnet bushing 340 can together define an annular flange channel 304. The stem flange 364 of the stem 160 can engage the annular flange channel 304 of the bushing assembly 300, as shown. In example aspects, the stem flange 364 can bear down on the bonnet bushing 340 at the annular indentation 303, which can aid in properly seating the bushing assembly 300 in the assembly bore 320. As shown, in example aspects, a clearance can be provided between the stem flange 364 and the annular flange channel 304, such that the stem flange 364 is not tightly received in the annular flange channel 304 and the stem 160 can easily rotate within the bushing bore 302.

Example aspects of the stem 160 can define one or more circumferential stem grooves 370 formed in an outer stem surface 368 of the stem 160. For example, as shown, in one aspect, a first stem groove 370a can be formed proximate the bottom bore end 324 of the assembly bore 320 and a second stem groove 370b can be formed proximate the top bore end 322 of the assembly bore 320. A third stem groove 370c can be formed between the stem flange 364 and the first stem groove 370a, and fourth and fifth stem grooves 370d, 370e can be formed between the stem flange 364 and the second stem groove 370b. In other aspects, any number of stem grooves 370 can be formed at any suitable location along the middle portion 362 of the stem 160.

In the present aspect, each of the stem grooves 370a-e can be configured to receive a packing (not shown), such as, for example, an O-ring. For example, a primary O-ring (not shown) can be received in the first stem groove 370a to create a seal between the stem 160 and the bonnet 110. A secondary O-ring 371c (not shown) can be received in the third stem groove 370c to create a seal between the stem 160 and the bonnet bushing 340, and additional secondary O-rings 371d, 371e can be received in the fourth and fifth stem grooves 370d, 370e, respectively to create seals between the stem 160 and the stuffing box bushing 330. Each of the seals created by the primary O-rings and secondary O-rings 371c,d,e can prohibit or minimize fluid flow past the seals. Furthermore, each of the primary O-rings and secondary O-rings 371c,d,e received in the stem grooves 370a-e can allow the stem 160 to rotate relative to the bushing assembly 300, the bonnet 110, and the stuffing box 150, while maintaining a watertight seal with each of the these elements. In other aspects, the stem grooves 370 can be located on the bushing assembly 300, the bonnet 110, and/or the stuffing box 150, provided that their positioning allows for creating a watertight seal with the stem 160.

A protective O-ring (not shown) can be received in the second stem groove 370b and can create a seal between the stem 160 and the stuffing box 150 at the top end 356 of the stuffing box 150. In some aspects, the protective O-ring can prevent undesirable external elements (e.g., ground water, silt, sand) from entering the assembly bore 320 and/or bushing bore 302 through the top end 356 of the stuffing box 150. In other aspects, a dirt seal mechanism can be provided for preventing undesirable elements from entering the bonnet and stuffing box assembly 100. In one aspect, the direct seal mechanism can be snapped onto the upper portion 361 of the stem 160 at the top end 356 of the stuffing box 150 and can cover the top bore end 322 of the assembly bore 320. In a particular aspect, for example, the dirt seal can define a generally umbrella-shaped cap.

The bonnet bushing 340 can define a circumferential bonnet bushing groove 346 formed in the outer bonnet bushing surface 342 thereof, and the stuffing box bushing 330 can define a circumferential stuffing box bushing groove 336 formed in the outer stuffing box bushing surface 332 thereof. Each of the bonnet bushing 340 and stuffing box bushing 330 can also define an annular chamfer 305 formed in the corresponding outer bonnet bushing surface 342 and outer stuffing box bushing surface 332. The annular chamfers 305 together can form an annular notch 306. A packing (not shown), such as another secondary O-ring 347, can be received in the bonnet bushing groove 346 to create a seal between the bonnet bushing groove 346 and the bonnet bore wall 314. A secondary O-ring 307 can also be received in the annular notch 306 to create a seal between the bushing assembly 300 and the bonnet bore wall 314. Each of the seals can prevent or minimize fluid flow past the seal.

In some aspects, a packing (not shown) can be received in the stuffing box bushing groove 336 to create a seal between the outer stuffing box bushing surface 332 and the stuffing box bore wall 354. However, in other aspects, it may not be necessary to create a seal between the outer stuffing box bushing surface 332 and the stuffing box bore wall 354 at the location of the stuffing box bushing groove 336.

As such, fluid received in the lower bonnet bore portion 318 can be prevented from entering the assembly bore 320 by the primary O-ring, or other packing, received in the first stem groove 370a proximate the bottom bore end 324 of the assembly bore 320. In the event that the seal provided by the primary O-ring fails and fluid enters the assembly bore 320, the secondary O-rings 371c-e received in the third, fourth, and fifth stem grooves 370c-e, respectively, can prevent the fluid from progressing further through the bushing bore 302, and the secondary O-rings received in the bonnet bushing groove 346 and annular notch 306 (and, if present, the secondary O-ring received in the stuffing box bushing groove 336) can prevent the fluid from progressing further through the assembly bore 320 around the bushing assembly 300. In some aspects, if fluid passes the O-ring formed in the annular notch 306, the fluid can exit through the gap 190 between the bonnet 110 and stuffing box 150.

Figure 4:
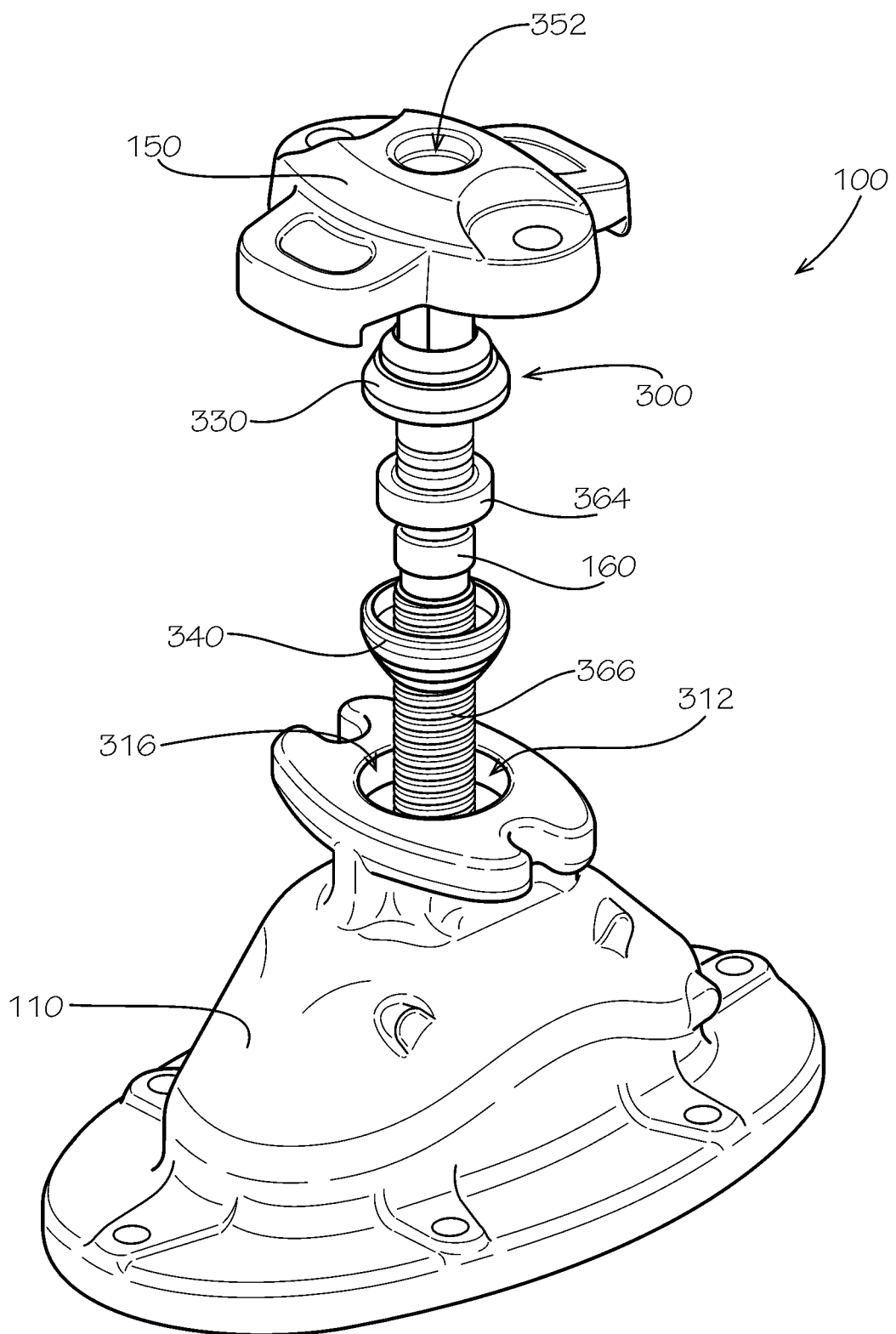
FIG. 4 is an exploded view of the bonnet and stuffing box assembly of FIG. 1.

FIG. 4 illustrates an exploded view of the bonnet and stuffing box assembly 100. In one aspect, a method for using the bonnet and stuffing box assembly 100 can comprising providing the stuffing box 150, the bonnet 110, the bushing assembly 300, and the stem 160, wherein the stuffing box 150 and bonnet 110 define the assembly bore 320 (shown in FIG. 3) within which the bushing assembly 300 can be received, the bushing assembly 300 defines the bushing bore 302 (shown in FIG. 3), and the stem 160 is received through the bushing bore 302 and the assembly bore 320. The method can further comprise sealing the stem 160 relative to the bushing assembly 300 to prohibit fluid flow through the bushing bore 302 and sealing the bushing assembly 300 relative to the bonnet 110 to prohibit fluid flow through the assembly bore 320, such as by installing the primary and secondary O-rings 371c-e, 307, 347 (shown in FIG. 3) previously described. Finally, the method can comprise turning the stem 160 relative to the bushing assembly 300, bonnet 110, and stuffing box 150 to actuate a valve. Example aspects of turning the stem 160 can comprise engaging the op nut 170 with a tool (not shown) and rotating the op nut 170 with the tool. Further example aspects of turning the stem 160 can comprise turning the threading 366 to translate a gate valve. In some aspects, the method can further comprise pressing the stem flange 364 of the stem 160 against the bushing assembly 300 to seat the bushing assembly 300 in the assembly bore 320.

Figure 5:
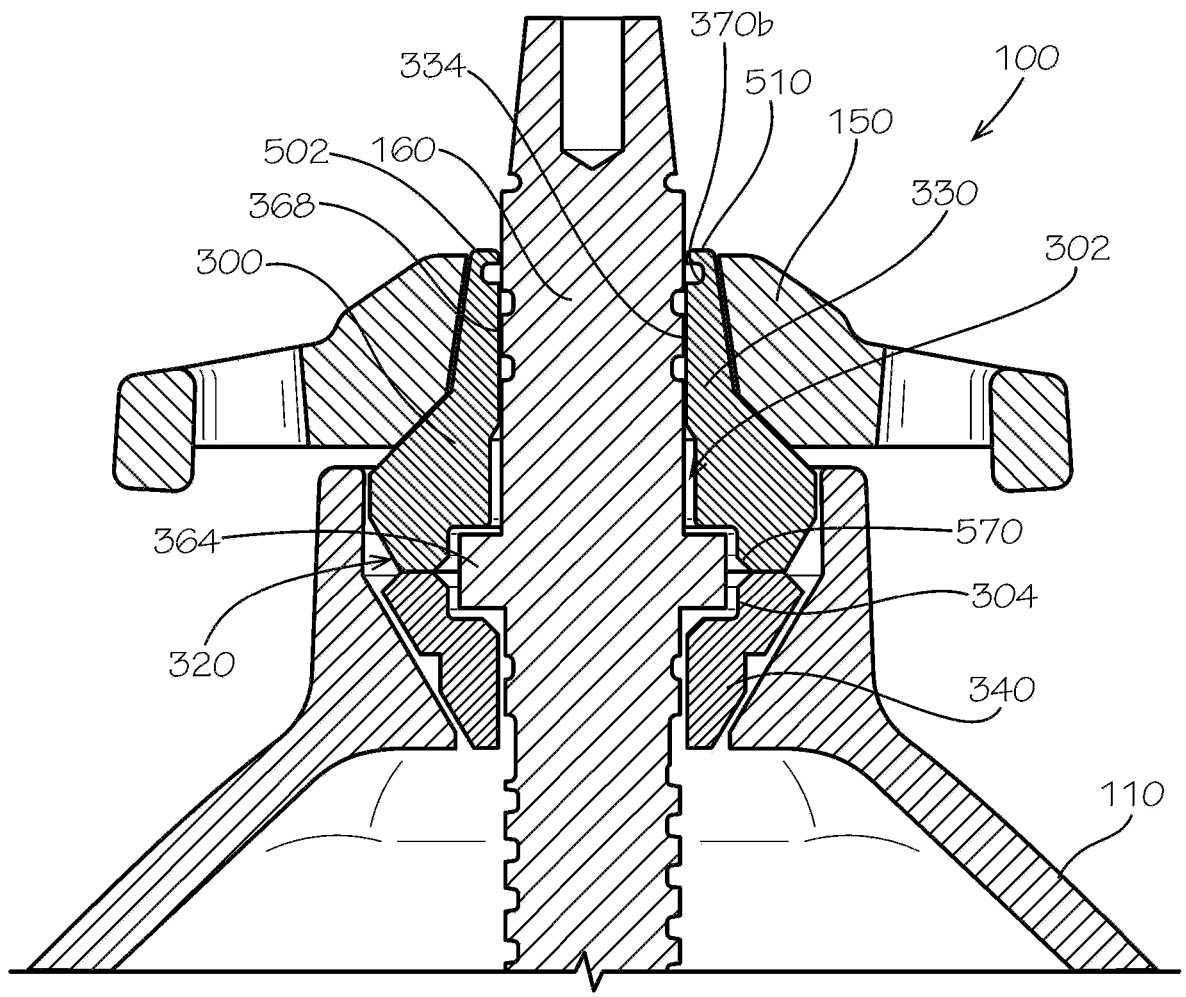
FIG. 5 is a cross-sectional view of the bonnet and stuffing box assembly, according to another aspect of the present disclosure.

FIG. 5 illustrates the bonnet and stuffing box assembly 100 according to another aspect, wherein the bonnet bushing 340 and the stuffing box bushing 330 can differ from one another and can be asymmetrical when installed in the bonnet and stuffing box assembly 100. While differing in shape, the stuffing box bushing 330 and bonnet bushing 340 of the present aspect can function substantially similarly to the identical stuffing box bushing 330 and bonnet bushing 340 of FIGS. 1-4. One notable difference is that, in the present aspect, a sixth stem groove 570 can be formed in the annular flange channel 304 of the bushing assembly 300. A packing (not shown), such as an O-ring, can be received therein to form a seal between the stem 160 and the bushing assembly 300 at the location of the stem flange 364. Another difference is that the second stem groove 370b can be formed in the stuffing box bushing bore wall 334 of the stuffing box bushing 330, instead of in the outer stem surface 368 of the stem 160.

Also in the present aspect, a dirt seal 510 can be formed at a top end 502 of the bushing assembly 300 proximate the top bore end 322 (shown in FIG. 3) of the assembly bore 320. The dirt seal 510 can serve to prohibit undesirable external elements from entering the assembly bore 320 and/or bushing bore 302 through the top bore end 322 of the assembly bore 320. Example aspects of the dirt seal 510 can be configure to overhang the second stem groove 370b, as shown, and can extend between the stem 160 and the stuffing box 150, such that the top bore end 322 of the assembly bore 320 is completely covered.

Figure 6:
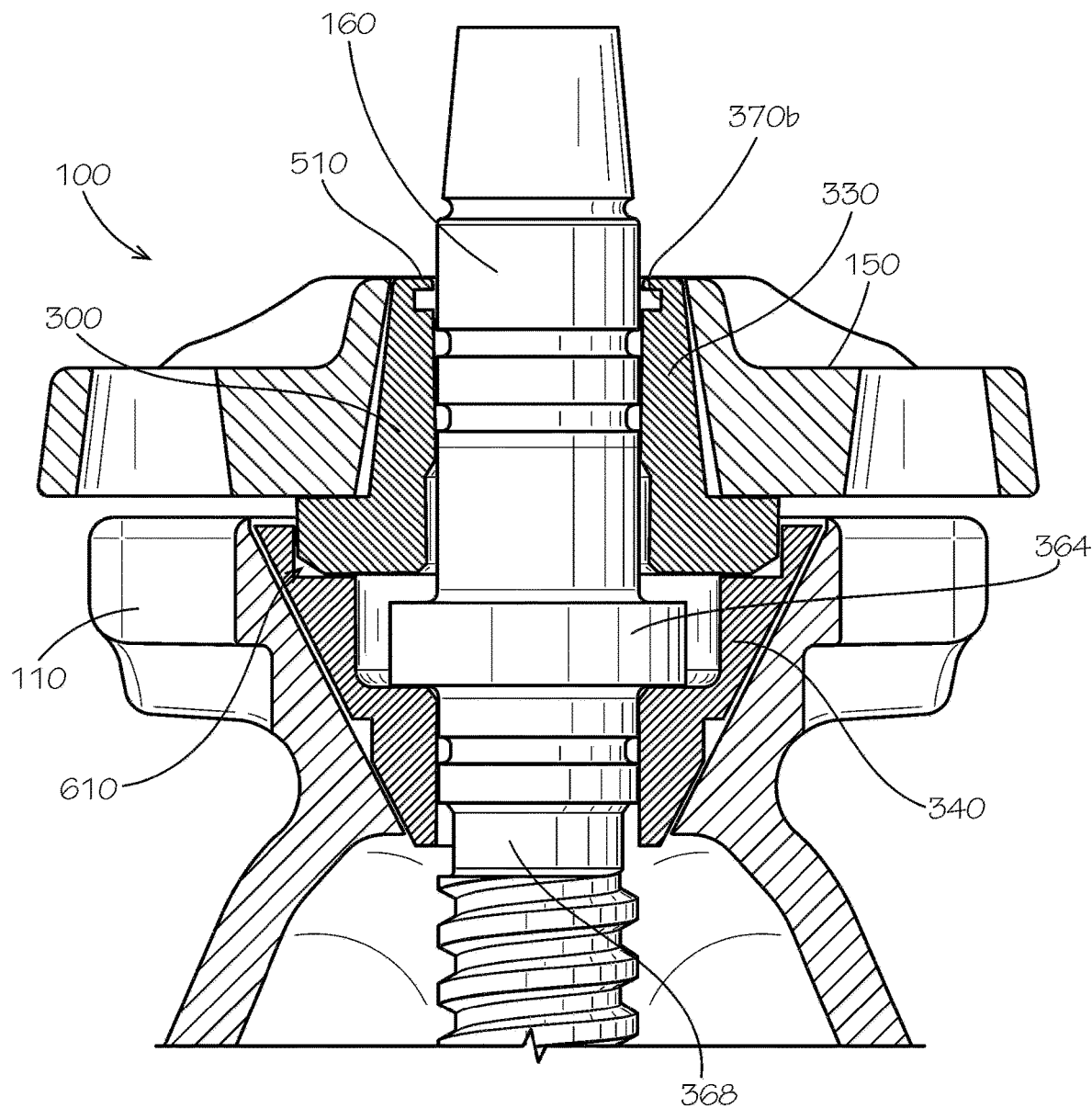
FIG. 6 is a front view of the bonnet and stuffing box assembly, according to another aspect of the present disclosure, wherein a bushing assembly, a bonnet, and a stuffing box are shown in cross-section.

FIG. 6 illustrates still another aspect of the bonnet and stuffing box assembly 100, wherein the bonnet bushing 340 and the stuffing box bushing 330 can differ from another and can be asymmetrical when installed in the bonnet and stuffing box assembly 100. The stuffing box 150, bonnet 110, and bushing assembly 300 are shown in cross-section, such that the outer stem surface 368 of the stem 160 is visible. While differing in shape, the stuffing box bushing 330 and bonnet bushing 340 of the present aspect can function substantially similar to the identical stuffing box bushing 330 and bonnet bushing 340 of FIGS. 1-4. One notable difference, however, is that, in the present aspect, a bushing groove 610 can be formed between the stuffing box bushing 330 and the bonnet bushing 340 when the bushing assembly 300 is assembled. A packing (not shown), such as an O-ring, can be received in the bushing groove 610 to create a seal between the stuffing box bushing 330 and the bonnet bushing 340.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:
1. A method of using a bonnet and stuffing box assembly comprising:
   providing a stuffing box, a bonnet, a bushing assembly, and a stem, the stuffing box and the bonnet defining an assembly bore, the bushing assembly received in the assembly bore, the bushing assembly defining a bushing bore, and the stem received through the bushing bore;
   sealing the stem relative to the bushing assembly to prohibit fluid flow through the bushing bore;
   sealing the bushing assembly relative to the bonnet to prohibit fluid flow through the assembly bore;
   pressing a stem flange of the stem against the bushing assembly to seat the bushing assembly in the assembly bore; and
   turning the stem relative to the bushing assembly, bonnet, and stuffing box to actuate a valve;
   wherein:
      the bushing assembly comprises a bonnet bushing disposed at least partially within the bonnet and a stuffing box bushing disposed at least partially within the stuffing box;
      at least a portion of the stuffing box bushing extends beyond a top end of the bonnet;

the bonnet bushing defines a first annular indentation at a top end thereof and the stuffing box bushing defines a second annular indentation at a bottom end thereof;

the first annular indentation and the second annular indentation together define an annular flange channel extending radially outward from the bushing bore;

the stem flange engages the annular flange channel; and turning the stem relative to the bushing assembly comprises rotating the stem flange within the annular flange channel.

2. The method of claim 1, wherein turning the stem relative to the bushing assembly, bonnet, and stuffing box to actuate the valve comprises engaging an operating nut with a tool and rotating the operating nut with the tool, the operating nut mounted on the stem.

3. The method of claim 1, wherein the stuffing box bushing defines a stuffing box bushing bore wall, the bonnet bushing defines a bonnet bushing bore wall, and the bonnet bushing bore wall and the stuffing box bushing bore wall together defines the bushing bore.

4. The method of claim 3, wherein the stuffing box bushing and the bonnet bushing are substantially identical in size and shape.

5. The method of claim 3, wherein an outer bonnet bushing surface of the bonnet bushing defines a circumferential bonnet bushing groove, a packing received in the bonnet bushing groove, and wherein sealing the bushing assembly relative to the bonnet comprises engaging the packing with a bonnet bore wall of the bonnet.

6. The method of claim 3, wherein the stem defines a stem groove, a packing received in the stem groove, and wherein sealing the stem relative to the bushing assembly comprises engaging the packing with one of the stuffing box bushing bore wall and the bonnet bushing bore wall.

7. The method of claim 3, wherein each of the stuffing box bushing bore wall and the bonnet bushing bore wall are precision-machined.

8. The method of claim 1, further comprising securing the stuffing box to the bonnet with a fastener to retain the bushing assembly within the assembly bore.

9. The method of claim 1, wherein a lower portion of the stem external to the bushing bore defines threading configured to threadably engage the valve.

10. The method of claim 1, wherein:

the bonnet bushing is at least partially received in a substantially conical bonnet bore portion of the bonnet; and the stuffing box bushing is at least partially received in a substantially conical stuffing box bore portion of the stuffing box.

11. A method of manufacturing a bonnet and stuffing box assembly comprising:

casting a bonnet and a stuffing box from a corrosion-resistant material, the bonnet defining a substantially conical bonnet bore portion and the stuffing box defining a substantially conical stuffing box bore portion, the substantially conical bonnet bore portion and the substantially conical stuffing box bore portion together defining an assembly bore;

precision-machining a stuffing box bushing bore wall of a stuffing box bushing;

precision-machining a bonnet bushing bore wall of a bonnet bushing, the bonnet bushing and stuffing box bushing together defining a bushing assembly, the bonnet bushing bore wall and the stuffing box bushing bore wall together defining a bushing bore; and positioning the bushing assembly within the assembly bore; and securing the stuffing box to the bonnet with a fastener to retain the bushing assembly within the assembly bore;

wherein:

securing the stuffing box to the bonnet with the fastener comprises tightening the fastener to press a stem flange of a stem down upon the bushing assembly to seat the bushing assembly in the assembly bore;

precision-machining the stuffing box bushing bore wall comprises precision-machining a first annular indentation in the stuffing box bushing bore wall;

precision-machining the bonnet bushing bore wall comprises precision-machining a second annular indentation in the bonnet bushing bore wall;

the first annular indentation and the second annular indentation together define an annular flange channel; and the stem flange engages the annular flange channel.

12. The method of claim 11, further comprising extending the stem through the bushing bore of the bushing assembly.

13. The method of claim 11, further comprising positioning a first packing between the bushing assembly and the bonnet to create a seal therebetween.

14. The method of claim 13, further comprising positioning a second packing between the stem and the bushing assembly to create a seal therebetween.

15. The method of claim 14, wherein each of the first packing and the second packing is an O-ring.

16. The method of claim 11, further comprising precision-machining an outer bonnet bushing surface of the bonnet bushing and precision-machining an outer stuffing box bushing surface of the stuffing box bushing.

17. A method of using a bonnet and stuffing box assembly comprising:

providing a stuffing box, a bonnet, a bushing assembly, and a stem, the stuffing box and the bonnet defining an assembly bore, the bushing assembly received in the assembly bore, the bushing assembly defining a bushing bore, and the stem received through the bushing bore;

sealing the stem relative to the bushing assembly to prohibit fluid flow through the bushing bore;

sealing the bushing assembly relative to the bonnet to prohibit fluid flow through the assembly bore; and turning the stem relative to the bushing assembly, bonnet, and stuffing box to actuate a valve;

wherein:

the bushing assembly comprises a bonnet bushing disposed at least partially within the bonnet and a stuffing box bushing disposed at least partially within the stuffing box;

at least a portion of the stuffing box bushing extends beyond a top end of the bonnet;

the stuffing box bushing defines a stuffing box bushing bore wall;

the bonnet bushing defines a bonnet bushing bore wall;

the bonnet bushing bore wall and the stuffing box bushing bore wall together defines the bushing bore;

an outer bonnet bushing surface of the bonnet bushing defines a circumferential bonnet bushing groove;

a packing received in the bonnet bushing groove; and sealing the bushing assembly relative to the bonnet comprises engaging the packing with a bonnet bore wall of the bonnet.

18. A method of using a bonnet and stuffing box assembly comprising:

providing a stuffing box, a bonnet, a bushing assembly, and a stem, the stuffing box and the bonnet defining an assembly bore, the bushing assembly received in the assembly bore, the bushing assembly defining a bushing bore, and the stem received through the bushing bore;

sealing the stem relative to the bushing assembly to prohibit fluid flow through the bushing bore;

sealing the bushing assembly relative to the bonnet to prohibit fluid flow through the assembly bore; and turning the stem relative to the bushing assembly, bonnet, and stuffing box to actuate a valve;

wherein:
- the bushing assembly comprises a bonnet bushing disposed at least partially within the bonnet and a stuffing box bushing disposed at least partially within the stuffing box;
- at least a portion of the stuffing box bushing extends beyond a top end of the bonnet;
- the stuffing box bushing defines a stuffing box bushing bore wall;
- the bonnet bushing defines a bonnet bushing bore wall;
- the bonnet bushing bore wall and the stuffing box bushing bore wall together defines the bushing bore;
- the stem defines a stem groove;
- a packing received in the stem groove; and
- sealing the stem relative to the bushing assembly comprises engaging the packing with one of the stuffing box bushing bore wall and the bonnet bushing bore wall.

* * * * *